United States Patent
Harada et al.

(10) Patent No.: US 7,572,316 B2
(45) Date of Patent: Aug. 11, 2009

(54) METHOD FOR MANUFACTURING REDUCED METAL

(75) Inventors: Takao Harada, Kobe (JP); Hidetoshi Tanaka, Kobe (JP); Hiroshi Sugitatsu, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 270 days.

(21) Appl. No.: 10/763,239

(22) Filed: Jan. 26, 2004

(65) Prior Publication Data
US 2004/0163493 A1  Aug. 26, 2004

(30) Foreign Application Priority Data
Feb. 26, 2003  (JP)  ............... 2003-049471

(51) Int. Cl.
*C21B 13/08* (2006.01)

(52) U.S. Cl. ........................................ 75/484

(58) Field of Classification Search ............ 75/484; 266/176, 168
See application file for complete search history.

(56) References Cited

U.S. PATENT DOCUMENTS

| | | | | |
|---|---|---|---|---|
| 4,622,905 | A * | 11/1986 | MacDougall et al. | ....... 110/347 |
| 4,701,214 | A * | 10/1987 | Kaneko et al. | ............ 75/481 |
| 4,923,391 | A * | 5/1990 | Gitman | ............... 431/10 |
| 5,730,775 | A * | 3/1998 | Meissner et al. | ............ 75/436 |
| 5,885,521 | A | 3/1999 | Meissner et al. | |
| 5,989,019 | A * | 11/1999 | Nishimura et al. | ......... 432/138 |
| 6,063,156 | A | 5/2000 | Negami et al. | |
| 6,117,387 | A * | 9/2000 | Sarma et al. | ............. 266/145 |
| 6,129,777 | A | 10/2000 | Fuji et al. | |
| 6,149,709 | A | 11/2000 | Uragami et al. | |
| 6,152,983 | A | 11/2000 | Kamijo et al. | |
| 6,241,803 | B1 | 6/2001 | Fuji | |
| 6,251,161 | B1 | 6/2001 | Tateishi et al. | |
| 6,254,665 | B1 | 7/2001 | Matsushita et al. | |
| 6,258,149 | B1 | 7/2001 | Sugiyama et al. | |
| 6,284,017 | B1 * | 9/2001 | Kamei et al. | ................ 75/484 |
| 6,296,479 | B1 * | 10/2001 | Nishimura et al. | ......... 432/138 |
| 6,302,938 | B1 | 10/2001 | Kamijo et al. | |
| 6,319,302 | B1 | 11/2001 | Harada | |
| 6,334,883 | B1 | 1/2002 | Takenaka et al. | |
| 6,368,104 | B1 * | 4/2002 | Saxena et al. | .............. 432/138 |
| 6,368,379 | B1 * | 4/2002 | Tateishi et al. | ............... 75/484 |
| 6,413,295 | B2 | 7/2002 | Meissner et al. | |

(Continued)

FOREIGN PATENT DOCUMENTS

JP    2001-115204    4/2001

(Continued)

*Primary Examiner*—George Wyszomierski
*Assistant Examiner*—Tima M McGuthry-Banks
(74) *Attorney, Agent, or Firm*—Oblon, Spivak, McClelland, Maier & Neustadt, P.C.

(57) ABSTRACT

A method for manufacturing a reduced metal includes thermally reducing a metal oxide including a carbonaceous reductant disposed on a hearth moving in a reducing furnace, wherein the reducing furnace includes a plurality of primary burners for supplying fuel and primary combustion air, and a plurality of secondary combustion burners for supplying secondary combustion air; and wherein the primary combustion air and/or the secondary combustion air is oxygen-enriched air, the oxygen concentration in the primary combustion air supplied from at least one of the plurality of primary burners being controlled to be lower than the oxygen concentration in the secondary combustion air.

9 Claims, 3 Drawing Sheets

U.S. PATENT DOCUMENTS

| | | |
|---|---|---|
| 6,413,471 B1 * | 7/2002 | Kamikawa et al. .......... 266/177 |
| 6,500,381 B1 | 12/2002 | Harada |
| 6,503,289 B2 | 1/2003 | Tanigaki et al. |
| 6,511,316 B2 | 1/2003 | Harada et al. |
| 6,517,770 B1 | 2/2003 | Tateishi et al. |
| 6,521,171 B2 | 2/2003 | Tateishi et al. |
| 6,569,223 B2 | 5/2003 | Tanigaki et al. |
| 6,579,505 B2 | 6/2003 | Tsuchiya et al. |
| 6,585,800 B2 | 7/2003 | Sugitatsu et al. |
| 6,592,647 B2 | 7/2003 | Hino et al. |
| 6,592,649 B2 | 7/2003 | Kikuchi et al. |
| 6,602,320 B2 | 8/2003 | Fuji et al. |
| 6,630,010 B2 | 10/2003 | Ito et al. |
| 6,660,221 B2 | 12/2003 | Urabe et al. |
| 6,669,470 B2 | 12/2003 | Atsushi et al. |
| 6,669,756 B2 | 12/2003 | Urabe et al. |
| 6,685,466 B2 | 2/2004 | Harada et al. |
| 6,689,182 B2 | 2/2004 | Tokuda et al. |
| 6,749,664 B1 * | 6/2004 | Hoffman et al. ............... 75/484 |
| 7,032,526 B2 * | 4/2006 | Tetsumoto et al. .......... 110/342 |
| 2002/0027317 A1 | 3/2002 | Imaizumi |

FOREIGN PATENT DOCUMENTS

| | | |
|---|---|---|
| JP | 2002-97507 | 4/2002 |

* cited by examiner

METHOD FOR MANUFACTURING REDUCED METAL

BACKGROUND OF THE INVENTION

1. Field of the Invention

The present invention relates to a method for manufacturing a reduced metal by thermally reducing a metal oxide including a carbonaceous reductant with a moving hearth reducing furnace.

2. Description of the Related Art

In a method for manufacturing reduced iron (a reduced metal) with a rotary hearth reducing furnace (a moving hearth reducing furnace), coal (a carbonaceous reductant) is added to iron ore including iron oxide (a metal oxide), the mixture is charged on a hearth that moves in the reducing furnace, and the mixture is heated at a high temperature in the reducing furnace to reduce the iron oxide (the metal oxide) in the iron ore by the coal (the carbonaceous reductant), thus forming reduced iron (the reduced metal).

In the reducing furnace, a ring-shaped hearth is rotatably supported in the circumferential direction in a reducing furnace main unit having a doughnut shape. The reducing furnace includes a material-feeding unit for feeding the iron ore including the coal on a predetermined position of the hearth in the reducing furnace, and a product-discharging unit for discharging the reduced iron that is reduced in the furnace to the outside. Furthermore, a space that forms a high temperature atmosphere is formed on the hearth in the reducing furnace. The reducing furnace further includes primary burners for supplying fuel and primary combustion air to the space, secondary combustion burners for supplying secondary combustion air, and an exhaust gas duct for discharging exhaust gas generated by combustion in the furnace.

As described above, while the material-feeding unit feeds the iron ore including the coal on the hearth, the hearth rotates at a predetermined rate and the primary burners heat the space to form the high temperature atmosphere. Thus, the iron oxide in the iron ore on the hearth is reduced by the coal to form reduced iron while moving in the high temperature atmosphere in the furnace. The reduced iron is discharged from the product-discharging unit to the outside of the furnace.

The iron ore including the coal, which is heated while moving in the high temperature atmosphere in the furnace, generates a volatile matter generated from the coal, and CO gas generated by reductive reaction between the coal and the iron oxide in the iron ore. The volatile matter and the CO gas are hereinafter generically called combustible gas. In order to use the combustible gas efficiently, the secondary combustion burners supply the secondary combustion air, thereby properly burning the combustible gas in the furnace. Thus, the consumption of the fuel supplied from the primary burners can be reduced.

Furthermore, in a proposed method, preheated air or oxygen-enriched air is used for the primary combustion air and the secondary combustion air. The effect of using the oxygen-enriched air as the primary combustion air and the secondary combustion air is achieved by decreasing the content of nitrogen in the combustion air. That is, decreasing the content of nitrogen in the combustion air decreases the heat value for heating the nitrogen that barely contributes to heat the materials. Accordingly, this method decreases the consumption of the fuel supplied from the primary burners. Furthermore, since the amount of the exhaust gas discharged from the reducing furnace is decreased, the processing equipment of the exhaust gas can be reduced in size, thereby reducing the operating cost and the equipment cost.

The decrease of the nitrogen content in the combustion air increases the temperature of burned gas. In this case, the generation of nitrogen oxides (NOx) increases, thereby increasing the NOx content in the exhaust gas in the reducing furnace. Accordingly, NOx removal equipment is required. Furthermore, for example, the equipment must be large-scaled and the amount of the equipment must be increased in order to take measures to reduce the NOx. Unfortunately, the increases of the area for installing the equipment, the operating cost, and the equipment cost cancel out the advantage due to the decrease of the fuel consumption. Any solution for this problem is not proposed hitherto; therefore, the practical application of the method is inhibited.

SUMMARY OF THE INVENTION

In order to solve the problem described above, it is an object of the present invention to provide a method for manufacturing a reduced metal, wherein oxygen-enriched air is used as combustion air to decrease the fuel consumption in a reducing furnace, while NOx content in the exhaust gas in the reducing furnace is not increased.

According to an aspect of the present invention, a method for manufacturing a reduced metal includes thermally reducing a metal oxide including a carbonaceous reductant disposed on a hearth moving in a reducing furnace. The reducing furnace includes a plurality of primary burners for supplying fuel and primary combustion air, and a plurality of secondary combustion burners for supplying secondary combustion air. The primary combustion air and/or the secondary combustion air is oxygen-enriched air, the oxygen concentration in the primary combustion air supplied from at least one of the plurality of primary burners being controlled to be lower than the oxygen concentration in the secondary combustion air.

The CO concentration in the atmospheric gas in the furnace in the vicinity of at least one of the plurality of primary burners is preferably less than 2 volume percent.

The CO concentration in the atmospheric gas in the furnace in the vicinity of at least one of the plurality of primary burners is preferably less than 4 volume percent.

A degree of reduction represented by the formula $(CO+H_2)/(CO+CO_2+H_2+H_2O)$ in the atmospheric gas in the furnace in the vicinity of at least one of the plurality of primary burners is preferably less than 0.05.

At least one of the plurality of primary burners preferably has an air ratio of 1.0 or less.

The plurality of primary burners preferably has different air ratios.

The present invention provides a method for manufacturing a reduced metal, wherein oxygen-enriched air is used as combustion air to decrease the fuel consumption in a reducing furnace, while NOx content in the exhaust gas in the reducing furnace is not increased. Accordingly, measures for reducing NOx generation are not required. Thus, the method of the present invention is effective in decreasing the operation cost due to the decrease of fuel consumption.

DESCRIPTION OF THE PREFERRED EMBODIMENTS

Embodiments of the present invention will now be described in detail with reference to the drawings.

First Embodiment

Figure 1:
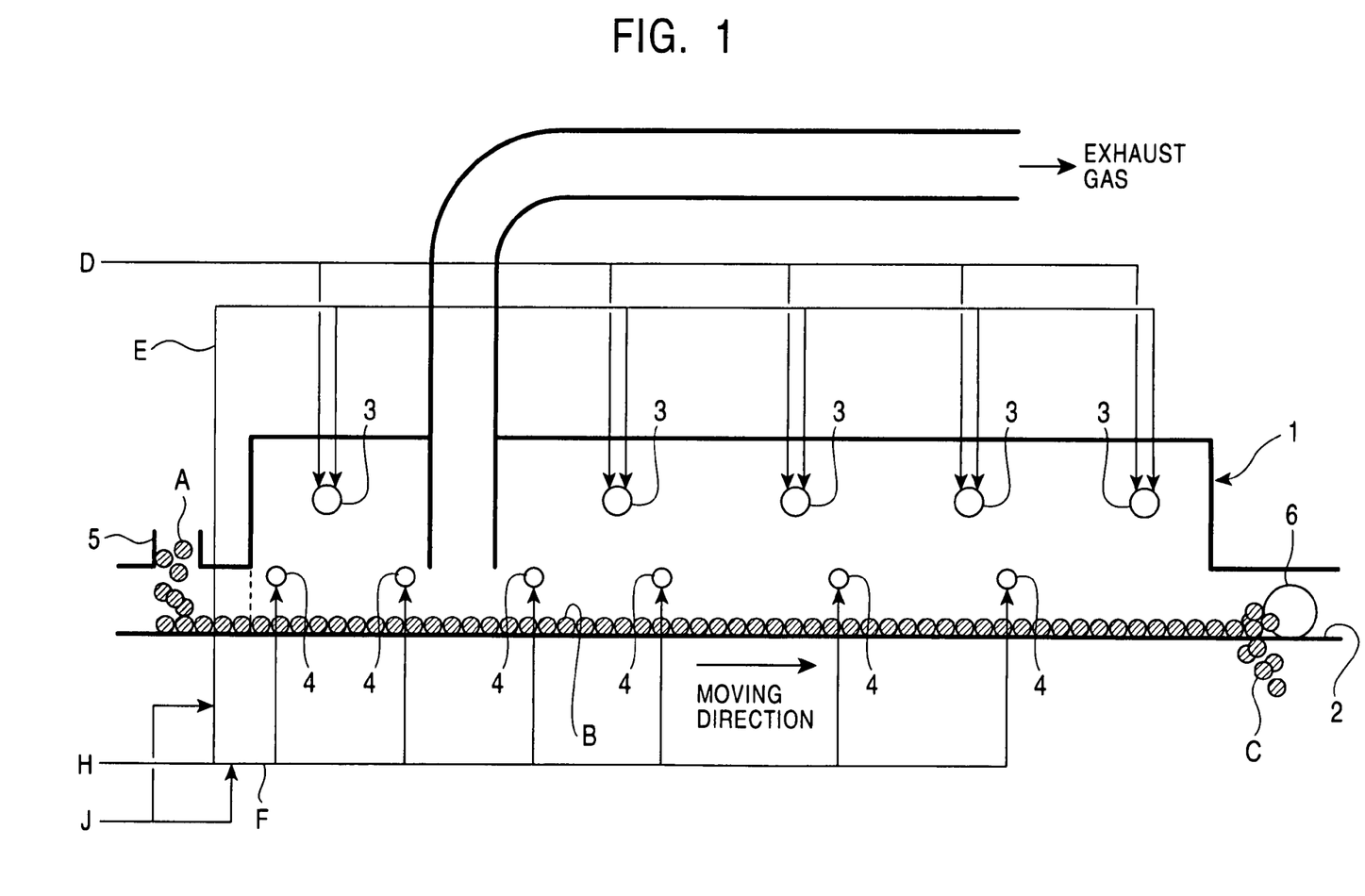
FIG. 1 is a schematic vertical cross-section in the circumference direction showing a rotary hearth reducing furnace according to an embodiment of the present invention.
Figure 2:
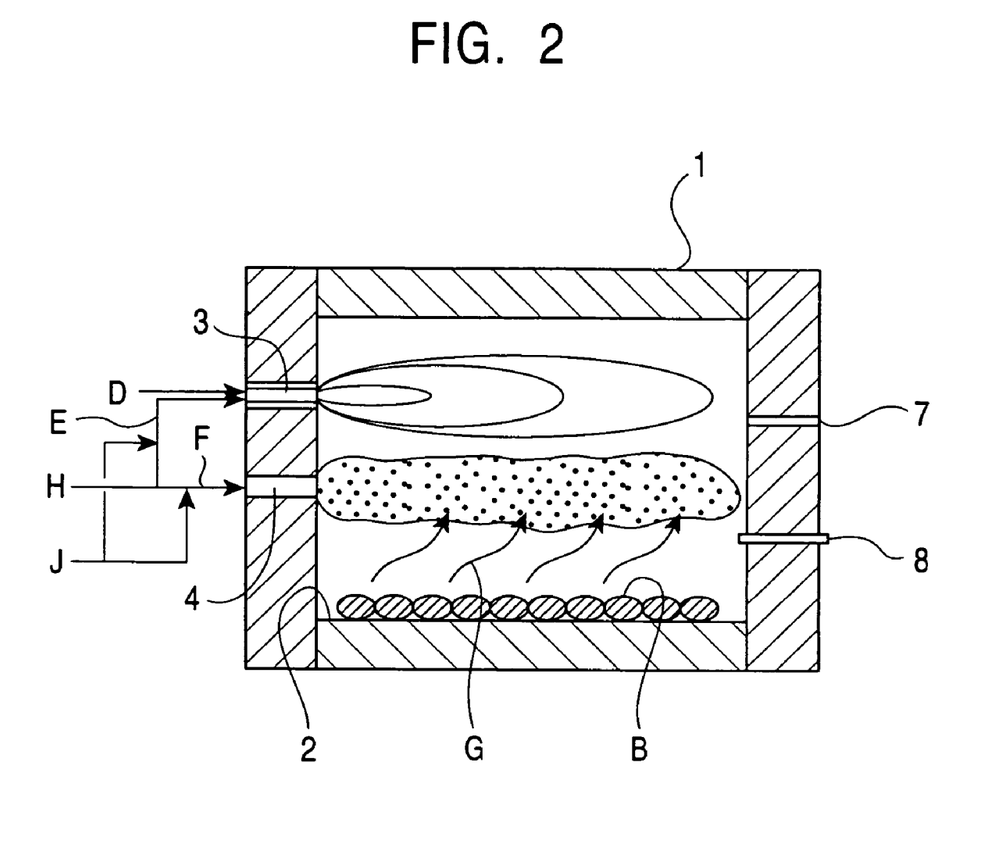
FIG. 2 is a schematic vertical cross-section in the radial direction showing the rotary hearth reducing furnace according to the embodiment of the present invention.

FIGS. 1 and 2 are schematic views of a rotary hearth reducing furnace according to an embodiment of the present invention. FIG. 1 is a vertical cross-section in the longitudinal direction (i.e., in the circumferential direction) of the rotary hearth reducing furnace wherein the doughnut-shaped rotary hearth reducing furnace is cut between a material-feeding unit and a product-discharging unit and the cut portion is then laid out in a linear shape. FIG. 2 is a vertical cross-section in the radial direction of the rotary hearth reducing furnace. Referring to FIGS. 1 and 2, a reducing furnace 1 includes a hearth 2, a plurality of primary burners 3, a plurality of secondary combustion burners 4, a material-feeding unit 5, a product-discharging unit 6, a plurality of gas-sampling holes 7, and temperature gauges 8.

Carbonaceous material-containing iron ore pellets A, i.e. pellets of a metal oxide including a carbonaceous reductant, (hereinafter also referred to as pellets A) are prepared as follows. Coal powder, i.e. a carbonaceous reductant, is mixed with iron ore powder, i.e. a metal oxide. The mixture is granulated in a wet manner to produce green pellets, and the green pellets are dried with a heat oven (not shown in the figure).

Referring to FIG. 1, the carbonaceous material-containing iron ore pellets A are fed on the hearth 2 rotating (moving) in the reducing furnace 1 at a predetermined rate with the material-feeding unit 5 to form a pellet layer B. The pellets A are thermally reduced to form reduced iron pellets C, i.e. pellets of a reduced metal. The product-discharging unit 6 discharges the reduced iron pellets C to the outside of the furnace.

The primary burners 3 and the secondary combustion burners 4 are disposed at the upper part of the hearth 2 in the reducing furnace 1. Natural gas D, i.e. fuel D, and primary combustion air E, i.e. oxygen-enriched air E, are supplied to the primary burners 3. Secondary combustion air F, i.e. oxygen-enriched air F, is supplied to the secondary combustion burners 4.

The natural gas D blown from the primary burners 3 into the reducing furnace 1 is allowed to react with the oxygen-enriched air E (primary combustion air E) and is burned to heat the reducing furnace 1 at a high temperature of about 1,000° C. to about 1,500° C. (The temperature gauges 8 disposed near the individual primary burners 3 measure the atmospheric temperature in the furnace.) The pellet layer B is heated by radiation while moving in the high temperature atmosphere. First, when the pellet layer B containing the coal is heated to about 400° C. to about 600° C., a volatile matter is generated. Subsequently, when the pellet layer B is heated to about 700° C. or more, a direct reductive reaction between iron oxide in the iron ore and carbon in the coal begins to generate metallic iron and CO gas ($Fe_xO_y+yC \rightarrow xFe+yCO$). Thus, the pellet layer B on the hearth 2 generates combustible gas G including the volatile matter and the CO gas. (If, for example, coke is used as the carbonaceous reductant instead of the coal, the volatile matter is not substantially generated.) The oxygen-enriched air F (secondary combustion air F) is blown from the secondary combustion burners 4. The combustible gas G is allowed to react with the oxygen-enriched air F (secondary combustion air F) and is burned. The gas burned by the secondary combustion burners 4 (i.e., burned gas) and the gas burned by the primary burners 3 (i.e., burned gas) form a high temperature atmosphere in the reducing furnace 1. Since the natural gas D and the oxygen-enriched air E (primary combustion air E) are supplied together to the primary burners 3, the combustion is readily performed. On the other hand, only the oxygen-enriched air F (secondary combustion air F) is supplied to the secondary combustion burners 4 and the combustible gas G from the pellet layer B is used as the fuel. Accordingly, the combustion is preferably performed before the combustible gas G is much diluted with the burned gas at the primary burners 3. Furthermore, the secondary combustion burners 4 are preferably disposed at the position lower than the primary burners 3.

In addition to the natural gas, examples of the fuel D include heavy oil and pulverized coal.

The oxygen-enriched air E and F may be a mixture of air at normal temperatures and oxygen. The oxygen-enriched air E and F may be, more preferably, a mixture of preheated air H and a predetermined amount of oxygen J. The preheated air H is prepared by preheating air at normal temperatures to, for example, in the range of 200° C. to 600° C. using a sensible heat of the exhaust gas in the reducing furnace with a heat exchanger (not in the figure). The use of preheated air H further decreases the fuel consumption and the amount of the exhaust gas. Pipes for introducing oxygen J that is added to the preheated air H are separately connected to the primary burners 3 and the secondary combustion burners 4 so that the oxygen concentration in the primary combustion air E and the oxygen concentration in the secondary combustion air F can be changed independently.

The oxygen-enriched air E and F are not limited to the above mixture of the preheated air H and oxygen J. Air at normal temperatures may be mixed with oxygen at normal temperatures in advance and then the mixture may be preheated. Air at normal temperatures and oxygen at normal temperatures may be separately preheated and then the preheated air may be mixed with the preheated oxygen. Furthermore, a common supply line of the oxygen-enriched air connected to both of the primary burners 3 and the secondary combustion burners 4 may be formed. Branched lines extended from the common supply line, each of the branched lines being connected to either the primary burners 3 or the secondary combustion burners 4 may be formed, and oxygen may be separately added to the branched lines from other lines.

The additive amount of the oxygen J is controlled depending on the amount of the preheated air H supplied to each of the primary burners 3 and each of the secondary combustion burners 4 such that the oxygen concentration in the primary combustion air E is lower than the oxygen concentration in the secondary combustion air F. In this case, the amount of the nitrogen oxides (NOx) generated in the reducing furnace 1 can be decreased, compared with the case where the oxygen concentrations are same in the primary combustion air E and in the secondary combustion air F, even if the total amount of the oxygen added to the reducing furnace 1 is same between the above both cases.

The reason for this is as follows. The adiabatic flame temperature at each of the primary burners 3 is very high, because, at each of the primary burners 3, the high calorie fuel D and the primary combustion air E are blown into the reducing furnace 1 together. On the other hand, the adiabatic flame temperature at each of the secondary combustion burners 4 is low because the combustible gas G generated little by little from the entire part of the pellet layer B on the hearth 2 is used as the fuel, and because the combustible gas G is mixed with the burned gas at the primary burners 3, thereby forming a very low calorie gas. Accordingly, when oxygen is added such that the primary combustion air E and the secondary combustion air F have the same oxygen concentration, the adiabatic flame temperature at each of the primary burners 3 is very high. Therefore, a very large amount of NOx is generated. According to the present invention, the additive amount of the oxygen is allocated such that the oxygen concentration in the primary combustion air E is lower than that in the secondary combustion air F. Since this method allows the oxygen concentration in the primary combustion air E at the primary burners 3 to be decreased, the rise of the adiabatic flame temperature can be suppressed and NOx generation is also decreased. On the other hand, as described above, the fuel at the secondary combustion burners 4 is a low calorie gas. Accordingly, even if the oxygen concentration in the secondary combustion air F is a little high, the adiabatic flame temperature at the secondary combustion burners 4 is not as high as the adiabatic flame temperature at the primary burners 3. The amount of NOx generation from the vicinity of the secondary combustion burners 4, the amount being originally small, is not increased so much and the NOx generation does not cause a serious problem. Accordingly, in this case, the amount of the nitrogen oxides (NOx) generated in the reducing furnace 1 can be decreased, compared with the case where the oxygen concentrations are same in the primary combustion air E and in the secondary combustion air F, even if the total amount of the oxygen added to the reducing furnace 1 is same between the above both cases.

If the oxygen concentration in the primary combustion air E is not so lower than the oxygen concentration in the secondary combustion air F, the effect of the NOx decrease is not sufficient. If the oxygen concentration in the primary combustion air E is too low compared with the oxygen concentration in the secondary combustion air F, the combustible gas G is not burned sufficiently. The reason for this is that the decrease of the nitrogen content in the secondary combustion air F drastically decreases the linear velocity of the gas blown from the secondary combustion burners 4, and the gas is not sufficiently mixed with the combustible gas G. Although the oxygen concentration in the primary combustion air E depends on the oxygen concentration of the secondary combustion air F, the oxygen concentration in the primary combustion air E is controlled to be lower than the oxygen concentration of the secondary combustion air F by, preferably, 5 to 50 volume percent, more preferably, 10 to 40 volume percent, and most preferably, 20 to 30 volume percent.

According to the present embodiment, each of the oxygen concentration in the primary combustion air E in all the primary burners 3 is controlled to be uniformly lower than the oxygen concentration in the secondary combustion air F. Alternatively, as described afterwards in a second embodiment to a fifth embodiment and Examples, each of the oxygen concentration in the primary combustion air E in the primary burners 3 may be controlled to be lower than the oxygen concentration in the secondary combustion air F by a different degree. Furthermore, the oxygen concentration in the primary combustion air E in some of the primary burners 3 may be controlled to be lower than the oxygen concentration in the secondary combustion air F, and the oxygen concentration in the primary combustion air E in the rest of the primary burners 3 may be the same as the oxygen concentration in the secondary combustion air F.

Second Embodiment

Referring to FIG. 2, the gas-sampling holes 7 are disposed in the vicinity of the primary burners 3. Atmospheric gas in each position in the furnace is taken out from each of the gas-sampling holes 7 to analyze the gas composition. If the CO concentration of the atmospheric gas at a primary burner 3 is less than 2 volume percent, preferably less than 4 volume percent, the oxygen concentration in the primary combustion air E of the primary burner 3 is preferably controlled to be lower than the oxygen concentration in the secondary combustion air F.

In general, unburned gas such as CO gas located in the vicinity of a burner decreases NOx generation. Accordingly, only in the primary burners 3 around which the content of the unburned gas such as CO gas in the furnace is small, the oxygen concentration in the primary combustion air E may be controlled to be lower than the oxygen concentration in the secondary combustion air F, thus suppressing the NOx generation. On the other hand, in the primary burners 3 around which the CO concentration in the atmospheric gas in the furnace is 2 to 4 volume percent or more, even if oxygen is added to the combustion air, the NOx generation is hardly increased. Therefore, in the primary burners 3 around which the CO concentration in the atmospheric gas in the furnace is 2 to 4 volume percent or more, the oxygen concentration in the primary combustion air E need not be lower than the oxygen concentration in the secondary combustion air F and, for example, may be the same as the oxygen concentration in the secondary combustion air F. Accordingly, the amount of the oxygen that can be added to the overall reducing furnace 1 is larger than the case in the first embodiment, thereby further decreasing the fuel consumption.

Third Embodiment

As a criterion whether the oxygen concentration in the primary combustion air E is controlled to be lower than the oxygen concentration in the secondary combustion air F or not, a degree of reduction (DR) in atmospheric gas in the furnace, i.e., $DR=(CO+H_2)/(CO+CO_2+H_2+H_2O)$ is preferably used, instead of the CO concentration in the atmospheric gas in the vicinity of each of the primary burners 3. That is, only in the primary burners 3 wherein the degree of reduction (DR) in the atmospheric gas in the vicinity of the burners is less than 0.05, the oxygen concentration in the primary combustion air E may be controlled to be lower than the oxygen concentration in the secondary combustion air F.

The atmospheric gas in the furnace includes unburned gas such as CO and $H_2$, and burned gas such as $CO_2$ and $H_2O$. The $H_2$ gas suppresses the NOx generation in the same way as the CO gas, whereas the gas such as $CO_2$ and $H_2O$ accelerate the NOx generation. Furthermore, the ratio of CO and $H_2$ in the atmospheric gas in the furnace changes depending on the kinds of the fuel D. Accordingly, use of the degree of reduction $DR=(CO+H_2)/(CO+CO_2+H_2+H_2O)$ allows more accurate decision whether the oxygen concentration in the primary combustion air E is controlled to be lower than the oxygen concentration in the secondary combustion air F or not, compared with just use of the CO concentration. Thus, the NOx generation can be suppressed more effectively. However, calculating the degree of reduction $DR=(CO+H_2)/(CO+CO_2+H_2+H_2O)$ requires more equipment such as analytical instruments and pipe arrangements compared with measuring only the CO concentration, because the concentrations of other components must be measured.

Fourth Embodiment

An air ratio of at least one of the primary burners 3 is preferably 1.0 or less, more preferably, 0.9 or less, and most preferably, 0.8 or less. In this case, unburned gas is left in burned gas in the primary burners 3. Accordingly, in the atmospheric gas in the vicinity of the primary burners 3, the CO concentration is increased to be 2 volume percent or more, or the degree of reduction DR is increased to be 0.05 or more. As described in the second embodiment or the third embodiment, the oxygen concentration in the primary combustion air E which is supplied to a primary burner 3 including the unburned gas needs not be controlled to be lower than the oxygen concentration in the secondary combustion air F. Accordingly, the amount of the oxygen that can be added to the overall reducing furnace 1 is larger than the case in the first embodiment, thereby further decreasing the fuel consumption.

Fifth Embodiment

As described in the fourth embodiment, the CO concentration and the degree of reduction DR in the burned gas (i.e., the atmospheric gas in the vicinity of each of the primary burners 3) varies depending on the air ratio of each of the primary burners 3, and the amount of NOx generation also varies. Accordingly, varying the air ratio of each of the primary burners 3 in the reducing furnace 1 (see Example 2 described below) allows a large amount of oxygen to be charged as much as possible in the reducing furnace 1, while substantially maintaining or decreasing the total amount of the NOx generation in the reducing furnace 1.

In the first embodiment to the fifth embodiment, a rotary hearth reducing furnace is used as a moving hearth reducing furnace; iron ore including iron oxide is used as a metal oxide; coal is used as a carbonaceous reductant; carbonaceous material-containing iron ore pellets are used as a metal oxide including a carbonaceous reductant; and reduced iron pellets are used as a reduced metal. However these examples are not served to limit the scope of the present invention.

In addition to the rotary hearth reducing furnace, a straight hearth reducing furnace may be used as the moving hearth reducing furnace.

In addition to the iron ore, examples of the metal oxide include a steel mill waste including iron oxide, such as blast furnace dust, converter dust, electric furnace dust, mill scale, and mill sludge. In addition to the iron oxide, the metal oxide may include a nickel oxide, a manganese oxide, and a chromium oxide.

In addition to the coal, examples of the carbonaceous reductant include coke, char, charcoal, carbide of biomass, and a carbon containing dust (for example, blast furnace dust).

In addition to the carbonaceous material-containing pellets, briquettes may be used as the metal oxide including a carbonaceous reductant that is charged on the hearth. In order to prepare the briquettes, metal oxide powder is mixed with carbonaceous reductant powder, and the mixture is subjected to compaction molding. Alternatively, the metal oxide powder coated with the carbonaceous reductant powder, and a mixture of the metal oxide powder and the carbonaceous reductant powder may be used.

In order to prepare the agglomerates such as the carbonaceous material-containing pellets and the briquettes, moisture or a binder generally need not be added in the agglomeration process but, if necessary, may be added. The agglomerates may be dried in advance and then may be charged in the reducing furnace. Alternatively, the agglomerates may be charged in the reducing furnace without drying.

In addition to the reduced iron, examples of the reduced metal to be manufactured may include metallic Ni, Mn, and Cr. In addition to sponge metals such as the reduced iron pellets, the reduced metal may be metal powder, metal plates, a molten metal, and a solid metal produced by melting and then solidifying the metal.

EXAMPLES

Example 1

Carbonaceous material-containing iron ore briquettes were charged in a rotary hearth furnace including a hearth having an external diameter of 8.5 m at a feed rate of 4 t/h. The briquettes were reduced in the furnace at a target atmosphere temperature of 1,350° C. to produce reduced iron. Natural gas was used as fuel of a primary burner. Air preheated at 350° C. was used as combustion air, and oxygen was added to the preheated air as the need arose.

In Comparative example 1, the reduction was performed under the condition that oxygen was not added to both of primary combustion air and secondary combustion air. In Comparative example 2, the reduction was performed under the condition that oxygen was uniformly added such that both of the primary combustion air and the secondary combustion air have the same oxygen concentration. In Example 1, the reduction was performed under the condition that the same total amount of oxygen as in Comparative example 2 was added to only the secondary combustion air.

Table 1 summarizes the operation results of Comparative example 1, Comparative example 2, and Example 1.

Referring to Comparative example 1 in Table 1, when oxygen was not added to the combustion air, the NOx concentration in the burned gas of the primary burner was 100 ppm, the NOx concentration in the burned gas of a secondary combustion burner was less than 5 ppm, and the NOx concentration in the exhaust gas discharged from the rotary hearth furnace was as low as 50 ppm. However, the flow rate of the exhaust gas discharged from the rotary hearth furnace was 12,000 m$^3$(normal state)/h, and the fuel supply was as large as 20 GJ/h. The total amount of the NOx in the exhaust gas amounted to 0.6 m$^3$(normal state)/h.

Referring to Comparative example 2 in Table 1, when oxygen was uniformly added to both of the primary combustion air and the secondary combustion air, the flow rate of the exhaust gas discharged from the rotary hearth furnace was decreased to 8,000 m$^3$(normal state)/h, and the fuel supply was also drastically decreased to 14 GJ/h. Although the NOx concentration in the burned gas of the secondary combustion burner was also less than 5 ppm, the NOx concentration in the burned gas of the primary burner was increased to 300 ppm. (This is because, as shown in Table 1, the adiabatic flame temperature at the primary burner was significantly increased.) The NOx concentration in the exhaust gas discharged from the rotary hearth furnace was also increased to 150 ppm. Furthermore, the total amount of the NOx in the exhaust gas was also drastically increased to 1.2 m$^3$(normal state)/h.

On the other hand, referring to Example 1 in Table 1, when oxygen was added to only the secondary combustion air, the flow rate of the exhaust gas discharged from the rotary hearth furnace was 8,000 m³(normal state)/h, and the fuel supply was 14 GJ/h as in Comparative example 2. Although the NOx concentration in the burned gas of the secondary combustion burner was increased to 50 ppm, this concentration was still a low level. (The reason for this seems to be as follows: as shown in Table 1, even though oxygen was added to the secondary combustion air, the adiabatic flame temperature at the secondary combustion burner was not increased so much.) The NOx concentration in the burned gas of the primary burner was 100 ppm as in Comparative example 1. As a result, the NOx concentration in the exhaust gas discharged from the rotary hearth furnace was 80 ppm, i.e., a low level. This NOx concentration was a little larger than that in Comparative example 1, but was smaller than that in Comparative example 2. Furthermore, the total amount of the NOx in the exhaust gas was 0.64 m³(normal state)/h, i.e., a low level as in Comparative example 1.

TABLE 1

|  | Comparative Example 1 | Comparative Example 2 | Example 1 |
|---|---|---|---|
| Primary Burner |  |  |  |
| Oxygen Concentration (volume percent) | 20.5 | 30 | 20.5 |
| Adiabatic Flame Temperature (° C.) | 2,220 | 2,760 | 2,220 |
| NOx in Burned Gas (ppm) | 100 | 300 | 100 |
| Secondary Combustion Burner |  |  |  |
| Oxygen Concentration (volume percent) | 20.5 | 30 | 50 |
| Adiabatic Flame Temperature (° C.) | 1,720 | 1,900 | 2,100 |
| NOx in Burned Gas (ppm) | <5 | <5 | 50 |
| Fuel Supply (GJ/h) | 20 | 14 | 14 |
| Flow rate of Exhaust Gas Discharged from Rotary Hearth Furnace (m³(normal state)/h) | 12,000 | 8,000 | 8,000 |
| NOx in Exhaust Gas Discharged from Rotary Hearth Furnace (ppm) | 50 | 150 | 80 |
| NOx in Exhaust Gas Discharged from Rotary Hearth Furnace (m³(normal state)/h) | 0.6 | 1.2 | 0.64 |

Example 2

Figure 3:
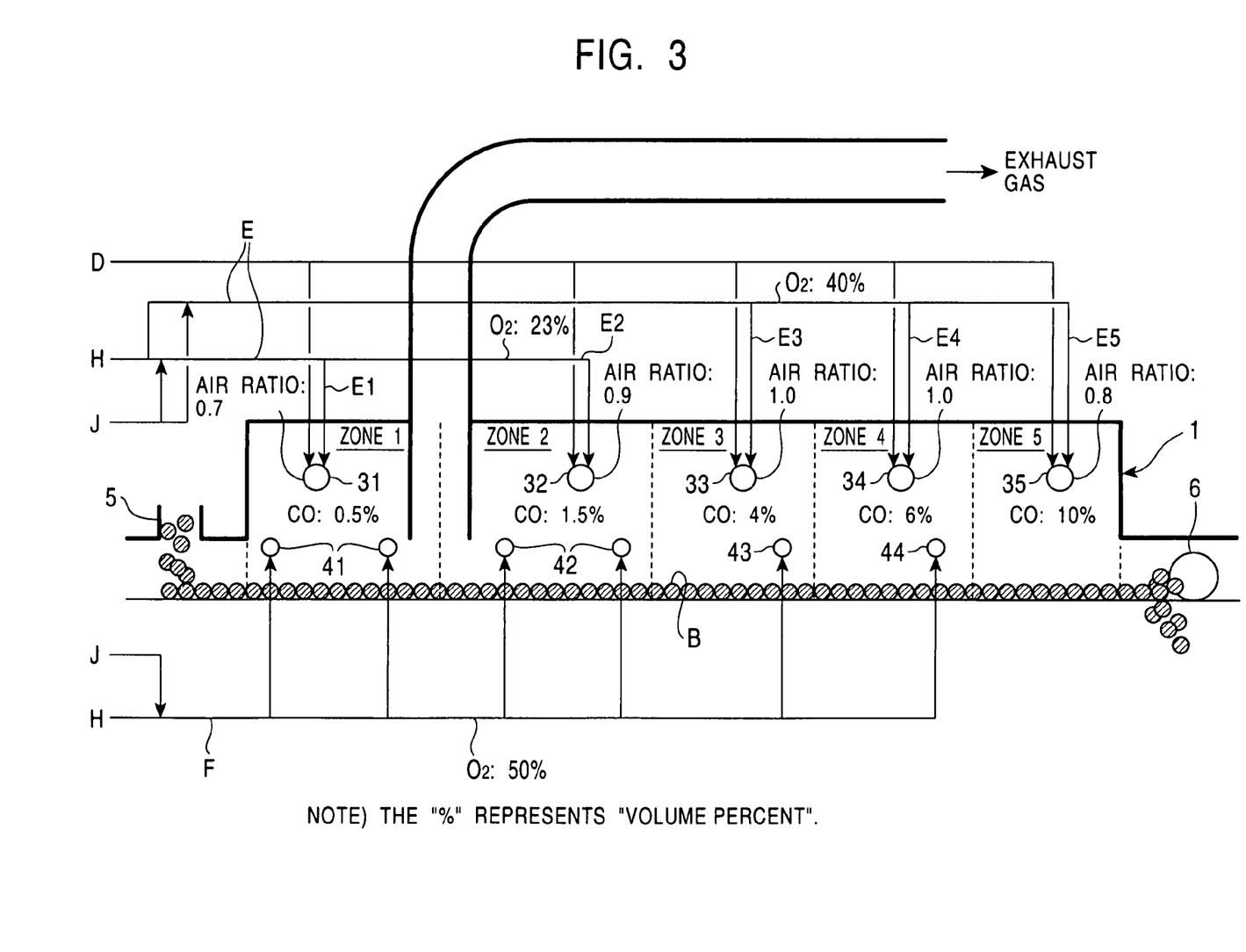
FIG. 3 is a vertical cross-section in the circumference direction explaining a combustion condition in the rotary hearth reducing furnace according to Example 2.

An example related to the above fifth embodiment will now be described. Referring to FIG. 3, the area of a high temperature atmosphere in the rotary hearth furnace 1 that was used in Example 1 was separated into five zones. Zones 1 to 5 were disposed in order from the portion adjacent to a material-feeding unit 5 to the portion adjacent to a product-discharging unit 6. (The number of zones may be changed depending on, for example, the dimension of the rotary hearth furnace 1 and the chemical properties of the material, and is not limited to five.) Each of the zones included each of the primary burners 3 (31 to 35) and each of the secondary combustion burners 4 (41 to 44). Zone 5 did not include a secondary combustion burner 4. The reason for this will be described later. Natural gas was used as fuel D of the primary burners 3 (31 to 35). The oxygen concentration of secondary combustion air F was 50 volume percent at each of Zones 1 to 4.

In Zone 1, the CO concentration in the atmospheric gas in the furnace was as low as 0.5 volume percent. Furthermore, the atmospheric gas in the furnace also includes 1 to 2 volume percent of $O_2$. Therefore, the air ratio of the primary burner 31 was controlled to be 0.7 in order to generate (leave) the unburned gas such as CO and $H_2$ efficiently. Since the CO concentration in the atmospheric gas in the vicinity of the primary burner 31 was less than 2 volume percent, the oxygen concentration in primary combustion air E1 of the primary burner 31 was controlled to be 23 volume percent, which was significantly lower than the oxygen concentration (50 volume percent) in the secondary combustion air F. Thus, the NOx generation from the primary burner 31 was suppressed.

In Zone 2, although the atmospheric gas in the furnace barely includes $O_2$, the CO concentration was 1.5 volume percent, i.e., still a low level. Therefore, the air ratio of the primary burner 32 was controlled to be 0.9 in order to generate (leave) a small amount of the unburned gas. Since the CO concentration in the atmospheric gas in the vicinity of the primary burner 32 was still less than 2 volume percent, as in Zone 1, the oxygen concentration in primary combustion air E2 of the primary burner 32 was controlled to be 23 volume percent, which was significantly lower than the oxygen concentration in the secondary combustion air F. Thus, the NOx generation from the primary burner 32 was suppressed.

In Zone 3 and Zone 4, the CO concentrations in the atmospheric gas in the furnace were 4 volume percent and 6 volume percent, respectively. Since these CO concentrations were high enough, the unburned gas was not required to be generated (left) anymore. Accordingly, the air ratios of the primary burners 33 and 34 were controlled to be 1.0. Since the CO concentrations in the atmospheric gas in the vicinity of the primary burners 33 and 34 were more than 2 volume percent, the oxygen concentrations in primary combustion air E3 and E4 did not require being lower than the oxygen concentration in the secondary combustion air F. However, in view of the balance of the amount of oxygen added to overall the reducing furnace 1, the oxygen concentrations in the primary combustion air E3 and E4 were controlled to be 40 volume percent, which was a little lower than the oxygen concentration in the secondary combustion air F. A high oxygen concentration in combustion air increases the adiabatic flame temperature at the burner, and readily causes NOx generation. Accordingly, when the CO concentration in the atmospheric gas in the furnace is less than 4 volume percent, the oxygen concentrations in the primary combustion air E3 and E4 are preferably controlled to be about 30 volume percent or less. Furthermore, the oxygen concentrations in the primary combustion air E3 and E4 depend on the temperature of the primary combustion air E3 and E4.

In Zone 5, the CO concentration in the atmospheric gas in the furnace was 10 volume percent and was high enough. In view of suppressing the NOx generation, the unburned gas was not required to be generated (left) anymore. However, in order to prevent the reoxidation of the reduced metal C, the air ratio of the primary burner 35 was controlled to be 0.8. Furthermore, the secondary combustion air F was not introduced in the furnace because of the same reason described above. If the reoxidation of the reduced metal C does not cause a serious problem, the secondary combustion air F may be introduced in Zone 5.

The air used as the primary combustion air E and the secondary combustion air F was prepared by mixing preheated air H heated at 350° C. with oxygen J, thus adjusting the oxygen concentration. It goes without saying that the oxygen J added to the preheated air H need not be pure oxygen.

The combustion in the reducing furnace 1 was regulated as follows. Secondary combustion burners 41 to 44 individually supplied predetermined amounts of the secondary combustion air F. The flow rates of the fuel D, which were supplied to the main burners 31 to 35, were individually controlled such that the atmospheric temperatures (measured with the temperature gauges 8 in FIG. 2) at Zone 1 to Zone 5 were independently maintained at predetermined temperatures. The flow rates of the primary combustion air E1 to E5, which were supplied to the main burners 31 to 35 were individually controlled according to the predetermined air ratios.

In order to minimize the consumption of the fuel D, the combustible gas G generated from the pellet layer B and the unburned gas generated by combustion in the primary burners 3 preferably burn in the reducing furnace 1 completely. Therefore, each of the flow rates of the secondary combustion air F1 to F4 was controlled so that, for example, CO and $H_2$ were not left in the exhaust gas in the reducing furnace 1.

This method allowed the fuel consumption to be drastically decreased compared with a typical operation in which the oxygen-enriched air was not used. Furthermore, this method allowed reduced iron to be manufactured without substantially increasing NOx content in the exhaust gas in the rotary hearth furnace (i.e., reducing furnace) 1.

What is claimed is:

1. A method for manufacturing a reduced metal, comprising the steps of:
    thermally reducing a metal oxide including a carbonaceous reductant disposed on a hearth moving in a reducing furnace, thereby producing a combustible gas from the thermal reduction of the metal oxide;
    supplying fuel and primary combustion air to the reducing furnace via a plurality of primary burners provided at a location such that heat from the combustion of the fuel contributes to the reduction of the metal oxide, and
    supplying secondary combustion air to the reducing furnace via a plurality of secondary burners at a location to combust the combustible gas from the reduction of the metal oxide,
    wherein at least the secondary combustion air is oxygen-enriched air, and the oxygen concentration in the primary combustion air is controlled to be lower than the oxygen concentration in the secondary combustion air.

2. The method for manufacturing a reduced metal according to claim 1, wherein the CO concentration in the atmospheric gas in the furnace in the vicinity of at least one of the plurality of primary burners is less than 2 volume percent.

3. The method for manufacturing a reduced metal according to claim 1, wherein the CO concentration in the atmospheric gas in the furnace in the vicinity of at least one of the plurality of primary burners is less than 4 volume percent.

4. The method for manufacturing a reduced metal according to claim 1, wherein a degree of reduction represented by the formula $(CO+H_2)/(CO+CO_2+H_2+H_2O)$ in the atmospheric gas in the furnace in the vicinity of at least one of the plurality of primary burners is less than 0.05.

5. The method for manufacturing a reduced metal according to claim 1, wherein at least one of the plurality of primary burners has an air ratio of 1.0 or less.

6. The method for manufacturing a reduced metal according to claim 1, wherein the plurality of primary burners has different air ratios.

7. The method for manufacturing a reduced metal according to claim 1, wherein the thermally reducing step is performed in a reducing atmosphere.

8. The method for manufacturing a reduced metal according to claim 1, wherein the oxygen enriched air comprises a mixture of air and oxygen.

9. The method for manufacturing a reduced metal according to claim 1, wherein the oxygen enriched air comprises a mixture of preheated air and oxygen.

* * * * *